(12) United States Patent
Ding et al.

(10) Patent No.: US 7,592,178 B2
(45) Date of Patent: Sep. 22, 2009

(54) FILTER INTEGRITY TESTER

(75) Inventors: Yuqing Ding, Perry Hall, MD (US);
Mark Shrewsbury, Perryville, MD (US); David K. Friday, Cockeysville, MD (US)

(73) Assignee: Hunter Menufacturing Co., Solon, OH (US)

( * ) Notice: Subject to any disclaimer, the term of this patent is extended or adjusted under 35 U.S.C. 154(b) by 701 days.

(21) Appl. No.: 11/064,462

(22) Filed: Feb. 23, 2005

(65) Prior Publication Data

US 2006/0188994 A1    Aug. 24, 2006

(51) Int. Cl.
| | |
|---|---|
| B01L 11/00 | (2006.01) |
| G01N 31/00 | (2006.01) |
| G01N 15/08 | (2006.01) |
| G01N 37/00 | (2006.01) |
| B01D 50/00 | (2006.01) |
| B01D 46/30 | (2006.01) |
| A62B 7/08 | (2006.01) |

(52) U.S. Cl. .................. 436/3; 422/101; 422/122; 55/486; 73/38; 73/28.01; 95/25

(58) Field of Classification Search ........ 422/101, 422/122; 436/3; 55/486; 73/38, 28.01; 95/25
See application file for complete search history.

(56) References Cited

U.S. PATENT DOCUMENTS

| | | | | |
|---|---|---|---|---|
| 4,135,896 A | * | 1/1979 | Parish et al. | 96/129 |
| 4,154,088 A | * | 5/1979 | Werner | 73/28.01 |
| 4,537,748 A | * | 8/1985 | Billiet | 422/122 |
| 4,619,136 A | | 10/1986 | Ortiz | |
| 4,964,278 A | * | 10/1990 | Wen et al. | 62/55.5 |
| 5,036,698 A | * | 8/1991 | Conti | 73/38 |
| 5,059,348 A | | 10/1991 | Guelta et al. | |
| 5,334,237 A | * | 8/1994 | Lorimer | 95/25 |
| 5,856,198 A | | 1/1999 | Joffe et al. | |
| 5,992,216 A | * | 11/1999 | Wang et al. | 73/28.01 |
| 6,287,023 B1 | * | 9/2001 | Yaegashi et al. | 396/565 |
| 6,327,893 B1 | | 12/2001 | Choi | |

(Continued)

FOREIGN PATENT DOCUMENTS

EP    0569754    11/1993

(Continued)

*Primary Examiner*—Jill Warden
*Assistant Examiner*—Lore Jarrett
(74) *Attorney, Agent, or Firm*—Fay Sharpe LLP (57) ABSTRACT

An apparatus and method for testing the integrity of a filter under humid conditions is provided. The apparatus includes an injection assembly which is located on a first side of the filter and a detection assembly which is spaced from the injection assembly and located on a second side of the filter. The injection assembly injects a mixture of an air stream and a hydrophilic test chemical vapor of a known concentration through the filter. The injection assembly includes a sealed vaporizer which generates the mixture of the air stream and the hydrophilic test chemical vapor. The vaporizer includes a contact bed having an inert packing media for vaporizing the hydrophilic test chemical. The detection assembly detects a concentration peak of the hydrophilic test chemical vapor exiting the filter. The detection assembly includes a chemical sampling member, a chemical enriching member and a chemical detector. At least one micro-controller communicates with the injection assembly and the detection assembly for controlling same.

11 Claims, 10 Drawing Sheets

U.S. PATENT DOCUMENTS 6,416,562 B1 * 7/2002 Shibuya et al. ............. 55/486
2002/0116984 A1 8/2002 Tilley

FOREIGN PATENT DOCUMENTS

| GB | 2 362 841 | 5/2001 |
| JP | 59010831 | 1/1984 |
| JP | 10206310 | 8/1998 |

* cited by examiner

FILTER INTEGRITY TESTER

BACKGROUND OF THE INVENTION

The present invention relates to a method and apparatus to test the integrity of a filter which can be newly installed or which has been in service for some period of time.

Traditionally, the integrity of a filter is tested by injecting a volatile chemical vapor into an air inlet line of the filter for a short period of time while simultaneously measuring a chemical vapor concentration in a filter effluent. Freon-type chemicals (inert, halogenated vapors) are typically used for this purpose because they are weakly adsorbed and such chemicals can be detected at very low concentrations (parts per trillion) using an electron capture detector. However, a major problem occurs when the filter has been exposed to a high relative humidity (i.e., above about 70%). When an inlet air stream of the filter has a high relative humidity, some of the injected Freon will not be adequately adsorbed due to the fact that the adsorbed water in the filter greatly decreases the adsorption capacity of the Freon. Therefore, the Freon will be nearly immediately detected in the filter effluent thus producing a false leak signal.

To solve the above problems, it would be desirable to use a chemical that is water soluble (i.e., a hydrophilic chemical) rather than water insoluble Freon gases. The adsorption capacity of a water-soluble vapor, such as an acetone, is typically enhanced by the presence of adsorbed water. A chemical detection method would be desirable in which an output air stream of the filter is sampled, enriched, separated, and detected in a series of detection operation steps. Such a chemical detection method could increase the detection concentration sensitivity by a factor of about five hundred. This is important because the higher the detection limit, the more chemical is needed in the feed to measure a leak. For example, to test a small leak (effluent-to-feed concentration level smaller than $1.0 \times 10^{-5}$) in a 20,000 CFM filter, the amount of the chemical needed would be reduced from about 30 kilograms to just 60 grams.

Accordingly, it has been considered desirable to develop an improved apparatus and method for testing integrity of a filter which is fully automated and easy to operate and would overcome the foregoing difficulties and others while providing better and more advantageous overall results.

BRIEF SUMMARY OF THE INVENTION

In an exemplary embodiment of the invention, an apparatus and method for testing integrity of a filter is provided.

More particularly, in accordance with this aspect of the present invention, an apparatus for testing the integrity of a filter under humid conditions includes an injection assembly which is located on a first side of the filter and a detection assembly which is spaced from the injection assembly and located on a second side of the filter. The injection assembly injects a mixture of an air stream and a hydrophilic test chemical vapor of a known concentration through the filter. The injection assembly includes a sealed vaporizer which generates the mixture of the air stream and the hydrophilic test chemical vapor. The vaporizer includes a contact bed having an inert packing media for vaporizing the hydrophilic test chemical. The detection assembly detects a concentration peak of the hydrophilic test chemical vapor exiting the filter. The detection assembly includes a chemical sampling member, a chemical enriching member and a chemical detector. At least one micro-controller communicates with the injection assembly and the detection assembly for controlling same.

In accordance with another aspect of the present invention, a method of testing filter integrity includes the step of vaporizing a hydrophilic test chemical in air to form a vapor. The vapor is injected into an inlet air stream of the filter and, the existence and concentration of the vapor in an outlet air stream from the filter is detected. The existence and extent of a leak in the filter is then determined.

In accordance with yet another aspect of the present invention, a method for detecting a concentration of a test chemical in an outlet air stream of a filter includes the step of injecting a predetermined mass of the test chemical into an inlet air stream of the filter. A volume of the outlet air stream from the filter is sampled, the outlet air stream including at least a portion of the predetermined mass of the test chemical. A second volume of air is then enriched with the sampled test chemical. The enriched second volume of air is heated and maintained at a high temperature thereby allowing the sampled test chemical to desorb into a gas phase. The mass of the sampled test chemical in the second volume of air is then detected.

In accordance with still yet another aspect of the present invention, a method of calibrating the effectiveness of a filter integrity tester is shown. The filter integrity tester has a detection assembly for detecting a concentration peak of a test chemical. The detection assembly includes a chemical sampling member, a chemical enriching member and a chemical detector. The method comprises the steps of injecting a predetermined mass of the test chemical into the chemical sampling member and sampling a volume of the test chemical. A second volume of air is then enriched with the test chemical. The enriched second volume of air is heated and maintained at a high temperature thereby allowing the enriched test chemical in the second volume of air to desorb into a gas phase. A mass of the test chemical in the second volume of air is detected and, compared with the predetermined mass of said test chemical.

Still other aspects of the invention will become apparent from a reading and understanding of the detailed description of the preferred embodiments hereinbelow.

BRIEF DESCRIPTION OF THE DRAWINGS

The present invention may take physical form in certain parts and arrangements of parts, a preferred embodiment of which will be described in detail in this specification and illustrated in the accompanying drawings which form a part of the invention.

DETAILED DESCRIPTION OF THE PREFERRED EMBODIMENT

Figure 1:
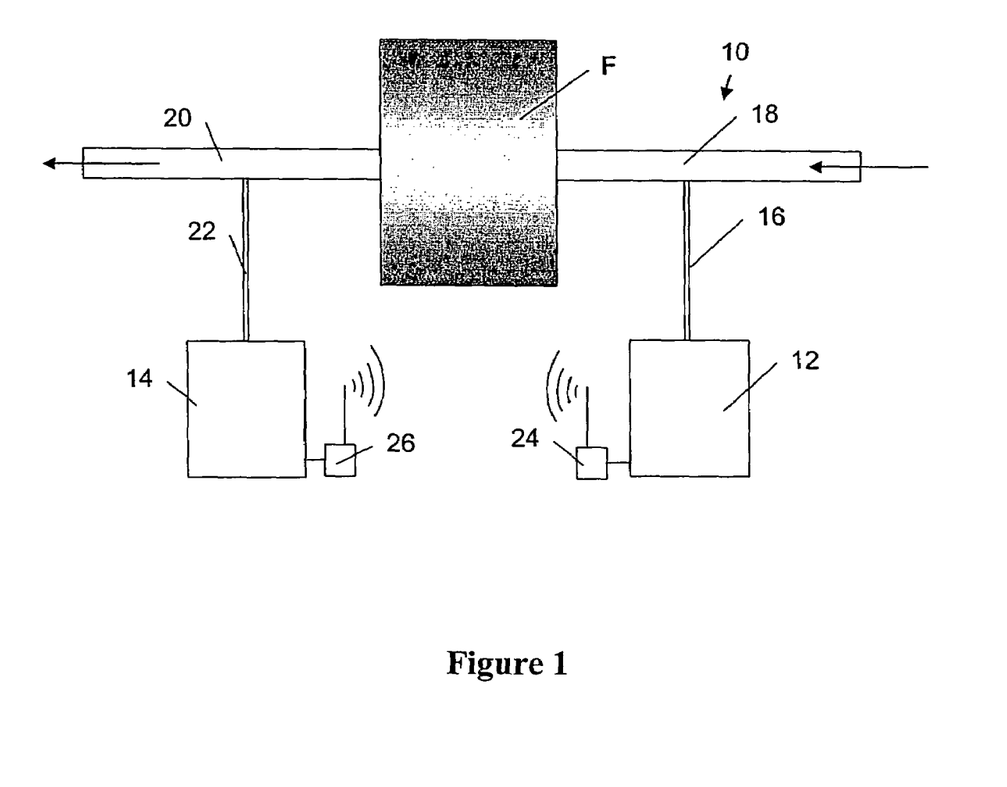
FIG. 1 is a schematic side elevational view of a filter integrity tester according to an embodiment of the present invention.

Referring now to the drawings, wherein the showings illustrate a preferred embodiment of the invention only and are not intended to limit same, FIG. 1 shows a diagram of an operation of an apparatus 10 for testing integrity of a filter F in accordance with an embodiment of the present invention.

With reference to FIG. 1, the filter integrity tester 10 includes an injection unit 12 which is located on a first side of a filter F and a detection unit 14 which is spaced from the injection assembly and located on a second side of the filter. The injection unit 12 injects a mixture of an air stream and a hydrophilic test chemical vapor of a known concentration through the filter F. The detection unit 14 detects a concentration peak of the hydrophilic test chemical vapor exiting the filter F.

During an integrity test cycle, a known amount of a hydrophilic test chemical stored in the injection unit 12 is vaporized and pumped through a transfer line 16 into an air stream inlet 18 of the filter F. The hydrophilic test chemical vapor is forced through the filter and is adsorbed by the filter. If there is no leak in the filter, all injected hydrophilic test chemical vapor will be adsorbed and an air stream outlet 20 of the filter F should not contain any such hydrophilic test chemical vapor. If there is a leak, a portion of the hydrophilic test chemical vapor will bypass adsorbent materials (not shown) in the filter and a certain amount of the hydrophilic test chemical vapor will appear in the air stream outlet 20. A volume of the air stream outlet 20 is sampled by the detection unit 14 using a sample transfer line 22. A sequence of steps (to be described in more detail below) is followed to detect the possible existence of the hydrophilic test chemical.

At least one micro-controller communicates with the injection unit 12 and the detection unit 14 for controlling both units by measuring certain parameters (temperature, pressure, and flow rate) and committing certain control logics. In the present invention, two micro-controllers MC1 (FIG. 2) and MC2 (FIG. 3), one for each unit, are provided. The micro-controllers can be mounted inside the injection unit and the detection unit, respectively. These can be conventional micro-controllers available from numerous manufacturers. As shown in FIG. 1, the operation of the injection unit and detection unit can be coordinated through a pair of known radio frequency (RF) transmitter/receiver units 24 and 26. Operation commands as well as operation parameters are exchanged between the micro-controllers through the RF units. The RF units also enable the injection assembly 12 and the detection assembly 14 to be spaced from each other at any desired distance and also spaced from the filter F.

Figure 2:
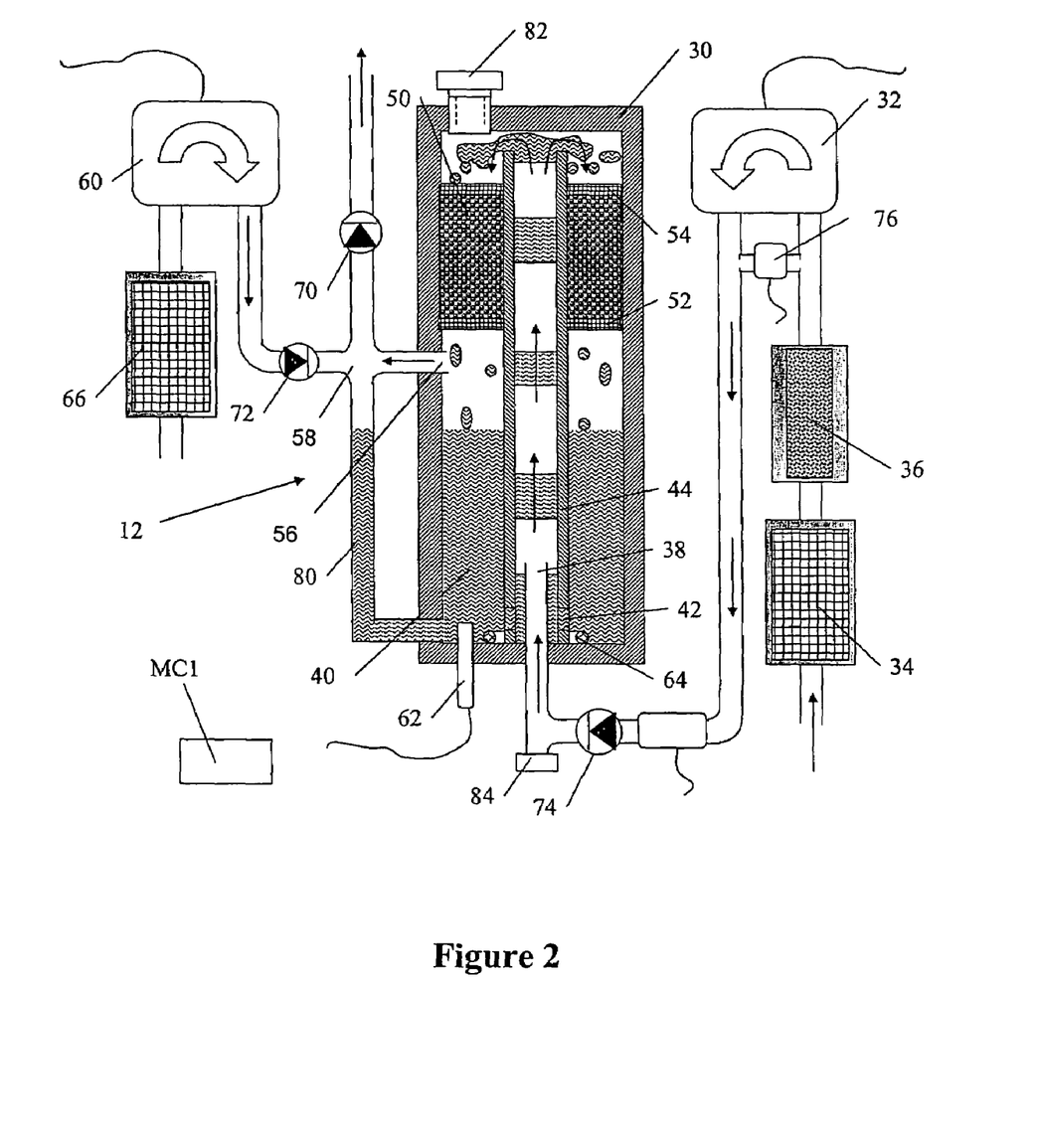
FIG. 2 is a schematic side elevational view, partially broken away, of an injection unit of the filter integrity tester of FIG. 1.

With reference to FIG. 2, the injection unit 12 includes a vaporizer 30 for generating the mixture of the air stream and the hydrophilic test chemical vapor. An air compressor 32 draws a first stream of ambient air through a particulate filter 34 and a chemical filter 36 into the vaporizer 30, which can be an enclosed, sealed chemical container.

The ambient air from the compressor 32 enters the vaporizer 30 through an air port 38 located on an outside surface of the vaporizer. In the present invention, the air port 38 is a small tubing typically about ¼ of an inch (0.635 cm) in diameter, although, it can be appreciated that the air port can have other configurations for generating a flow of air into the vaporizer 30. As the air stream blows out from the air port 38, the air stream will, through the venturi principle, pull some hydrophilic test chemical from a chemical reservoir 40 (through at least one inlet hole 42 located adjacent the air port) into the air stream. The mixture of the air stream and the hydrophilic test chemical is then pumped through an air driven pump 44, which has an inside dimension larger than an outside dimension of the air port 38. In the present invention, the air-driven pump 44 can be a cylindrical tubing with an inside diameter slightly larger than an outside diameter of the air port 38.

The mixture of the air stream and the hydrophilic test chemical is driven up the tubing comprising the pump 44 and forced against a top portion of the vaporizer 30 thereby evenly spreading the hydrophilic test chemical onto a contact bed 50. The contact bed can surround the upper portion of tubing forming a toroid. The contact bed 50 includes an inert packing media, such glass beads. The beads can be retained in place by at least one screen. In the present invention, two screens 52 and 54 are used to retain the contact bed. The hydrophilic test chemical wets the surfaces of the glass bead packing media and then drops into the chemical reservoir 40. Meanwhile, the air stream passing through the contact bed 50 is saturated with the hydrophilic test chemical vapor because of the sufficiently large surface area of the packing media. The air stream, now saturated with hydrophilic test chemical vapor, leaves the vaporizer 30 via an exit opening 56. It can mix immediately with a second stream of ambient air driven by a second air compressor 60 in a chamber 58. This mixing dilutes the concentration of the hydrophilic test chemical vapor and reduces the condensation temperature of the hydrophilic test chemical. Thus, the possibility of the hydrophilic test chemical vapor condensing in the injection line 16, as shown in FIG. 1, is eliminated.

It should be appreciated that when the hydrophilic test chemical is vaporized from the surface of the packing media, a significant amount of heat is taken away due to the evaporation process. Such a heat loss is continuously compensated by the fresh mixture of the air stream and the hydrophilic test chemical being driven from the air-driven pump 44, thus keeping the temperature at the evaporation surface of the packing media relatively constant. The temperature of the chemical reservoir 40 can be monitored by the injection unit micro-controller MC1 through a Resistor Temperature Detector ("RTD") 62. Also, an electric heating unit 64 located in the reservoir 40 compensates for provides compensation to the heat loss due to the vaporization process and regulates the evaporation temperature.

Particulate filters 34 and 66 can be used to filter out dust and other particulates in the first and second ambient air streams. If desired, a chemical filter 36 can be used to adsorb chemical pollutants from the first ambient air stream. Of course, such a filter can also be provided for the second air stream. A plurality of check valves 70, 72 and 74 prevents the hydrophilic test chemical, as well as the hydrophilic test chemical vapor, from entering the first and second air compressors 32, 60, thus protecting the air compressors. The check valves also prevent the hydrophilic test chemical from leaking when the injection unit 12 is transported.

The pressure difference across the first air compressor 32 is monitored by the injection unit micro-controller MC1 through a pressure sensor 76, in order to alert the user to any blockage in the particulate filters 34, 66 or in a system line. A high pressure difference indicates that the particulate filters need to be replaced and the injection unit needs to be serviced. The hydrophilic test chemical level in the chemical reservoir 40 is monitored by a chemical level indicator 80, which can include a transparent tubing, the tubing being installed so that it can be seen by the user. When the hydrophilic test chemical level is low, the hydrophilic test chemical can be refilled at a chemical refill port 82, which can be a seal plug. A chemical drain plug 84 provides a means to drain the hydrophilic test chemical inside the vaporizer 30 when the injection unit 12 needs to be stored or transported.

Figure 3:
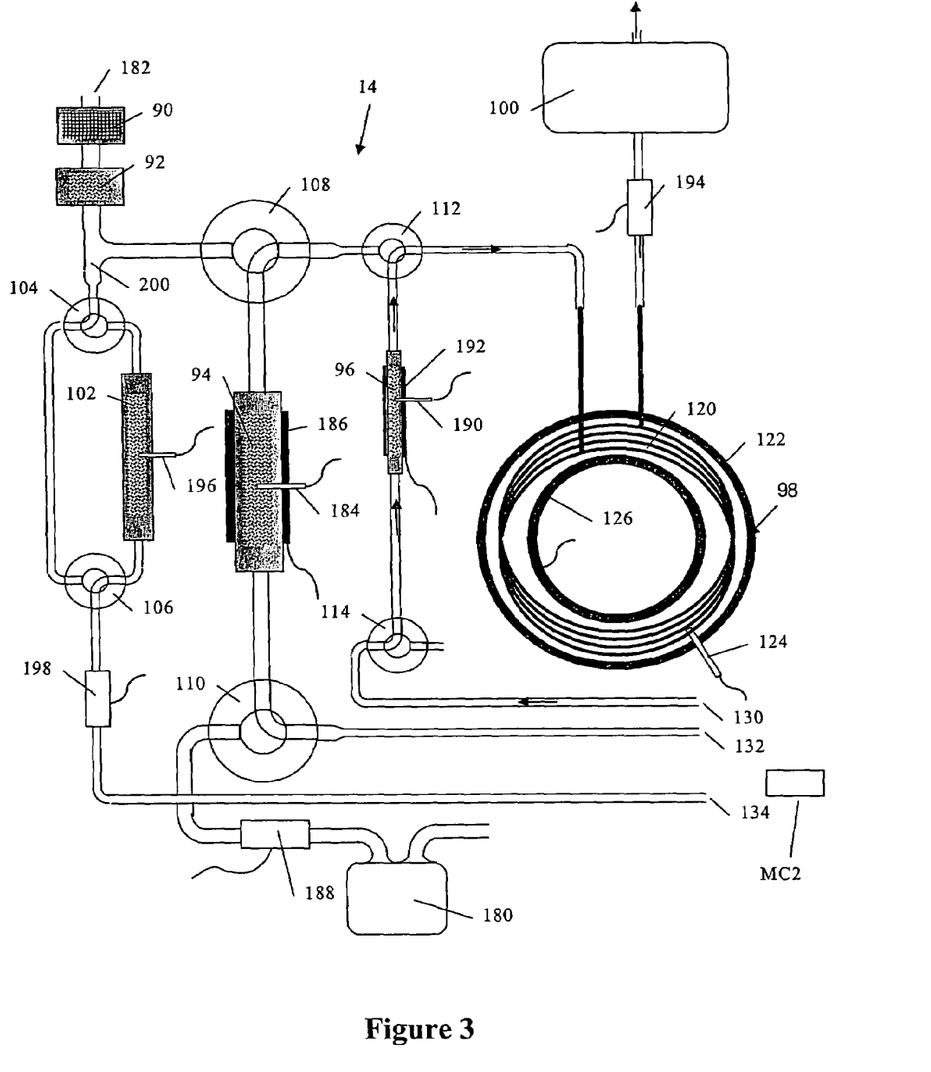
FIG. 3 is a schematic side elevational view, partially broken away, of a detection unit of the filter integrity tester of FIG. 1 at idle status.

With reference to FIG. 3, the detection unit 14 includes a dust filter 90, a low-volatility chemical filter 92, a chemical sampling member 94, a chemical enriching member 96, a gas chromatography ("GC") unit 98, a chemical detector 100, a calibration member 102, and a plurality of three-way valves 104, 106, 108, 110, 112, and 114. The detection unit 14 uses a chemical enriching step and a separation step to improve the detection limits of the detection unit. This, in turn, greatly decreases the amount of hydrophilic test chemical needed to inject into the filter F in order to detect a small leak.

The low-volatility chemical filter 92 is packed with an adsorbent that adsorbs a vapor of low-volatility organic chemicals that have six or more carbon atoms or equivalent. Thus, chemicals such as the hydrophilic test chemical will pass through the adsorbent. The sampling member 94 and the enriching member 96 are packed with a hydrophobic, carbonaceous adsorbent. The size of the sampling member 94 is generally determined by the weight of the packed hydrophobic, carbonaceous adsorbent. In the embodiment disclosed, the sampling member 94 is about twenty times as large as that of the enriching member 96. It should be recognized that other ratios could also be provided. The GC unit 98 includes a packed gas chromatography column 120, a column enclosure 122, a temperature detector 124, such as an RTD, and an electric heating unit 126. The temperature of the GC unit is controlled by the detection unit micro-controller MC2. The chemical detector 100 can be a Photo Ionization Detector ("PID"). Unlike many other chemical detectors such as a Flame Ionization Detector, the PID detector does not require any combustible gas to operate, and is very sensitive to the hydrophilic test chemical.

Figure 4:
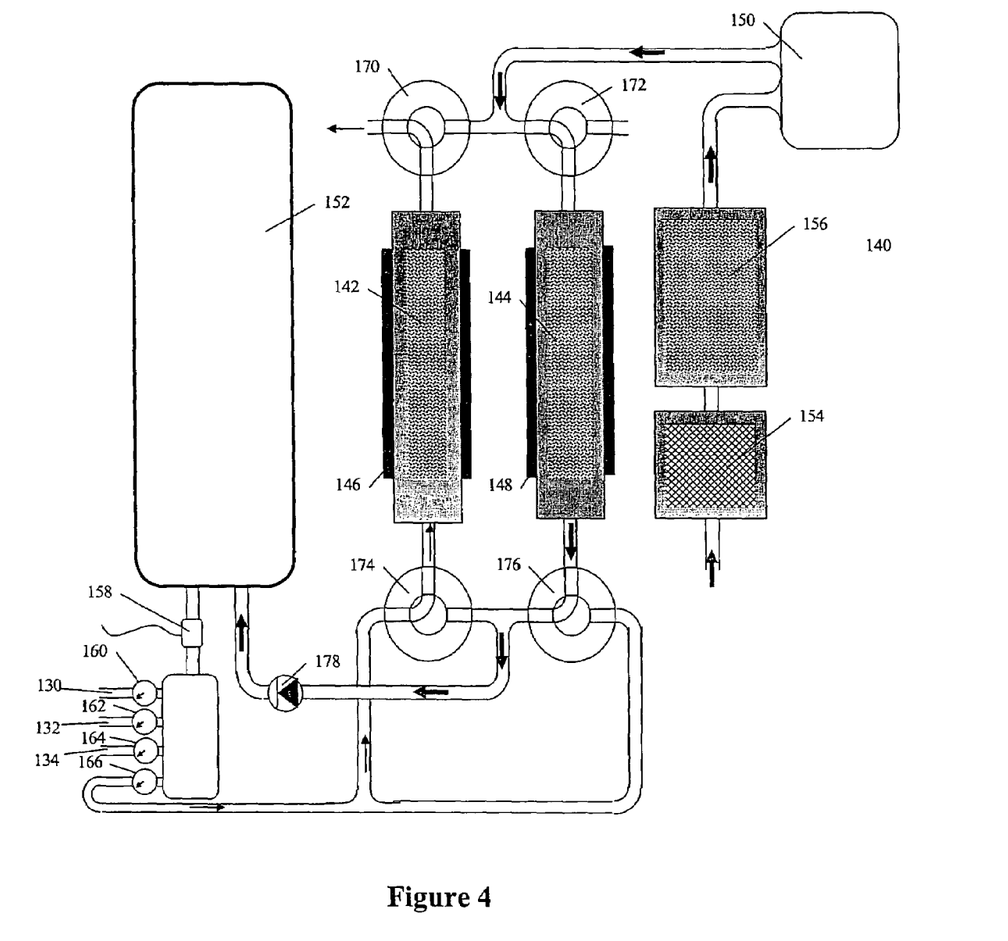
FIG. 4 is a schematic side elevational view, partially broken away, of a clean air generation unit for use with the filter integrity tester of FIG. 1.

Clean, dry air is supplied at a plurality of clean air ports 130, 132 and 134, each with an individually regulated pressure to yield a specifically required flow rate. The clean air is generated with a clean air generation subunit 140 as shown in FIG. 4. The clean air generation subunit can be enclosed inside the detection unit 14.

With reference to FIG. 4, the clean air generation subunit 140 can include first and second regenerable filters 142 and 144. Each filter can be packed with a hydrophobic adsorbent layer, such as coconut-shell carbon, which adsorbs chemical impurities, and a hydrophilic adsorbent layer, such as silica gel, which adsorbs water vapor. Each filter 142 and 144 can include a respective electric heating element 146 and 148. The heating elements can be positioned either inside or outside the two filters in order to heat the adsorbent layers located inside the filters. An air compressor 150 compresses a stream of ambient air through the filter 142 or 144 into a clean air storage cylinder 152. A particulate filter 154 and a low-volatility-chemical filter 156 are used to filter dust and low-volatility chemical impurities from the stream of ambient air. The clean air cylinder 152 stores the compressed clean air. The pressure inside the clean air cylinder can be measured using a pressure sensor 158. A set of pressure regulators, 160, 162, 164, and 166 regulates the clean air pressure and supply individual clean air flow streams for the detection unit 14.

Among these, pressure regulator 166 regulates a small, low-pressure clean air stream for the purpose of filter regeneration. Three-way valves 170, 172, 174, and 176 are used to switch the first and second regenerable filters 142, 144 for filtration or for regeneration. A check valve 178 stops the compressed clean air in the clean air cylinder 152 from flowing back through the filters 142, 144 into the ambient environment.

A computer program in the detection unit micro-controller MC2 can monitor the pressure inside the clean air cylinder 152 using the pressure sensor 158. When the pressure is lower than a user-defined minimum pressure, the micro-controller MC2 starts the air compressor 150 to increase the pressure to a user-defined maximum pressure. Air flowing out of the adsorbing second filter 144, which is maintained at a lower temperature and higher pressure, is clean of chemical contaminants and water vapor, and is compressed into the clean air cylinder 152. Meanwhile, a small stream of clean air is introduced from the regulator 166 through the first filter 142, which is maintained at a higher temperature and lower pressure. Both organic impurities and water vapor adsorbed in the adsorbent layers in the first filter 142 are gradually purged out to the ambient environment, thus regenerating the first filter for a next cycle. When the pressure inside the clean air cylinder 152 is higher than a preset maximum pressure, the air compressor 150 is turned off. The regenerating process for the first filter 142 keeps going until the pressure inside the clean air cylinder 152 drops down below the minimum pressure. At this point, the statuses of the four three-way valves 170, 172, 174, and 176 are reversed, and the air compressor 150 is turned on for the next cycle. In it, the first filter 142 serves as the adsorbing filter and second filter 144 is regenerated. In this manner, the run time of each cycle is determined by the values of the minimum pressure and the maximum pressure. For each cycle, the total volume passing through the adsorbing filter is fixed, while the actual cycle time may vary from cycle to cycle.

A typical test cycle for testing the integrity of a filter can include a series of four steps: (a) a sampling/injecting step; (b) an enriching step; (c) a heating step; and (d) a detecting step.

Figure 5:
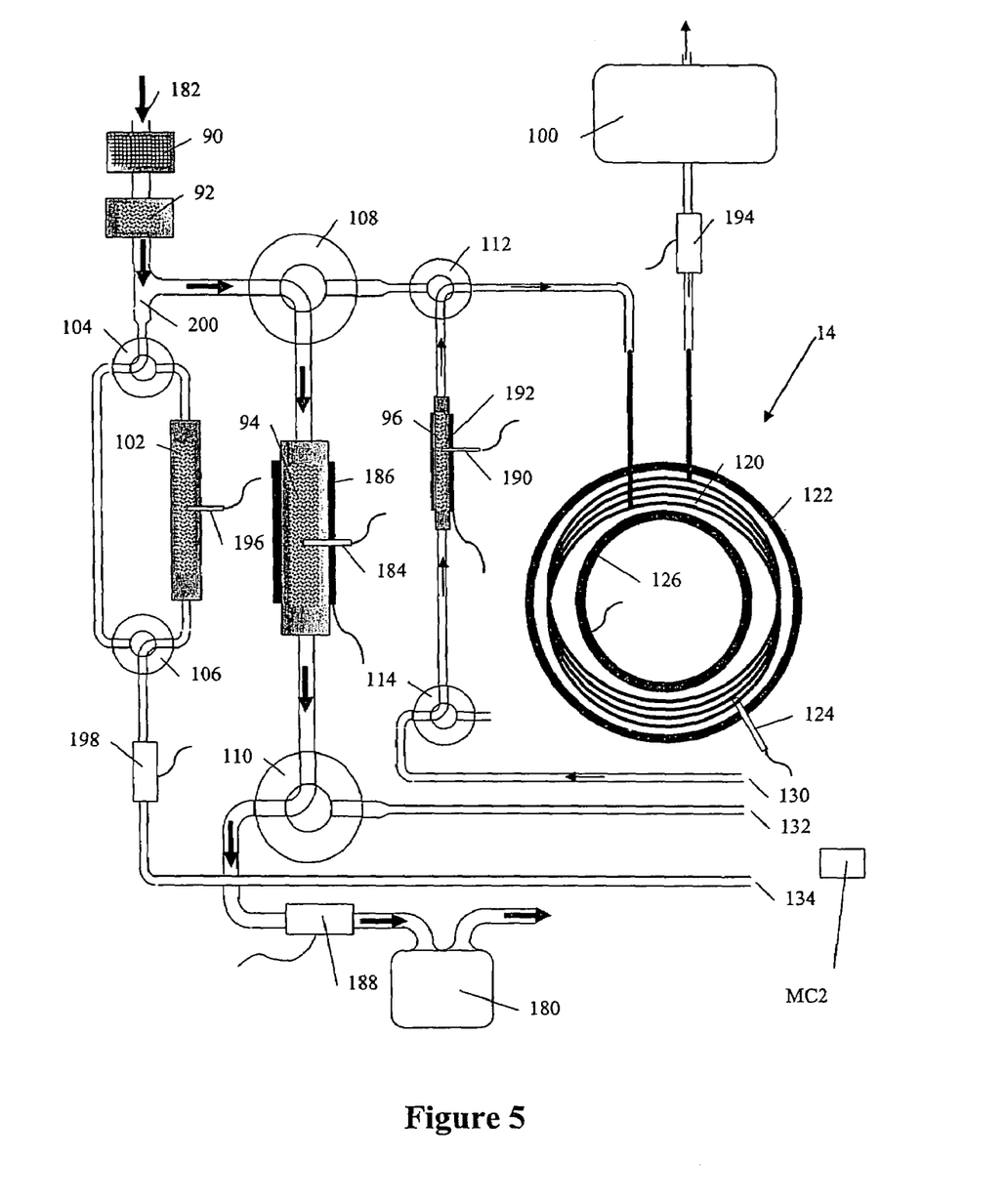
FIG. 5 is a schematic view of a valve configuration and flow pattern of the detection unit of FIG. 3 during a sampling/injection step.

The filter integrity cycle starts with the sampling/injecting step. The valve configuration and flow pattern of the detection unit 14 are shown in FIG. 5. In the sampling/injecting step, the first and second air compressors 32 and 60 of the injection unit 12 (see FIG. 2) are turned on by a signal sent through the RF units 24 and 26. Meanwhile, a sampling pump 180 is activated, drawing a relatively large amount of a flow stream (e.g., 4 liters per minute) from an outlet stream 182 (equivalent to an outlet air stream in the transfer line 22 in FIG. 1) and successively through the particulate filter 90, the low-volatility-chemical filter 92, and the sampling member 94. Low-volatility chemicals and dust in the outlet stream 182 is filtered out by the particulate filter 90 and the low-volatility chemical filter 92. The temperature of the sampling member 94 can be regulated at approximately 50° C. at this step by the micro-controller MC2 through a RTD 184 and an electric heating element 186. At this temperature, water vapor is very weakly adsorbed by the hydrophobic, carbonaceous adsorbent located in the sampling member 94, and most of the water vapor passes through the sampling member, while organic chemicals are collected inside the sampling member. This mechanism greatly reduces the possibility of water condensing in transfer lines during the remaining steps of the typical test cycle for testing filter integrity.

During the sampling/injecting step, the mass of the injected hydrophilic test chemical is integrated over an injection time by the injection unit micro-controller MC1. This information is then sent to the detection unit micro-controller MC2 for subsequent leakage calculations. The flow rate in the sampling member 94 (which is the same flow rate of the outlet air stream in the transfer line 22 in FIG. 1) is measured by the detection unit micro-controller using a flow meter 188. A total sampling volume is integrated over the sampling time, and stored for subsequent leakage calculations.

Figure 6:
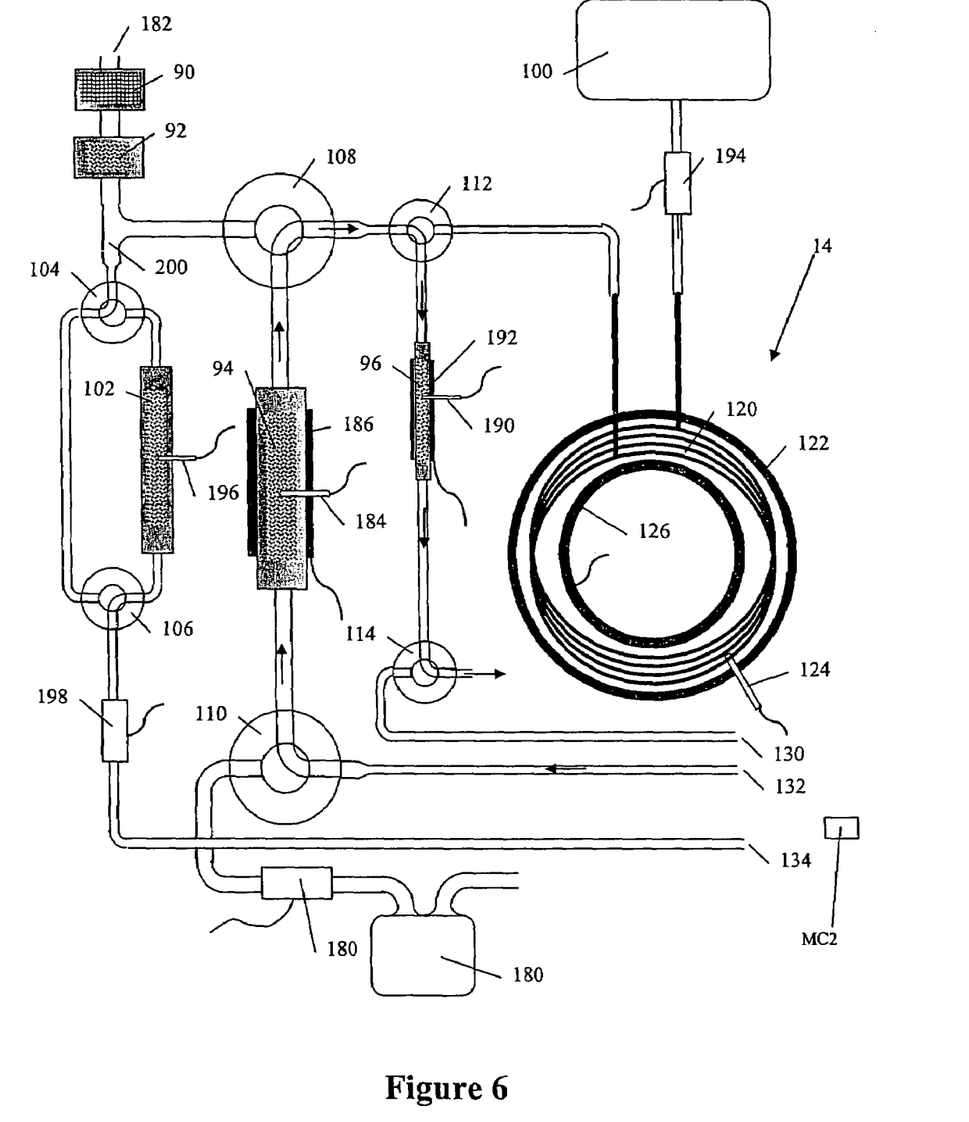
FIG. 6 is a schematic view of a valve configuration and flow pattern of the detection unit of FIG. 3 during an enriching step.

The valve configuration and flow pattern of the enriching step is shown in FIG. 6. in the enriching step, the sampling pump 180 deactivated, and the sampling member 94 is quickly heated to and regulated at a relatively high temperature (e.g., approximately 200° C.). A small stream of clean air, typically 50 ml/min, is passed successively through the sampling member 94 and the enriching member 96, which is regulated at a lower temperature (e.g. approximately 50° C.) by the micro-controller MC2 through a temperature sensor 190 and an electric heating element 192. The chemicals previously adsorbed by the sampling member 94 during the sampling step is now desorbed and transferred into the enriching member, which is packed with a much smaller amount of the hydrophobic, carbonaceous adsorbent. Again, any water vapor trapped in the sampling member 94 will, mostly pass through the enriching member 96.

Figure 7:
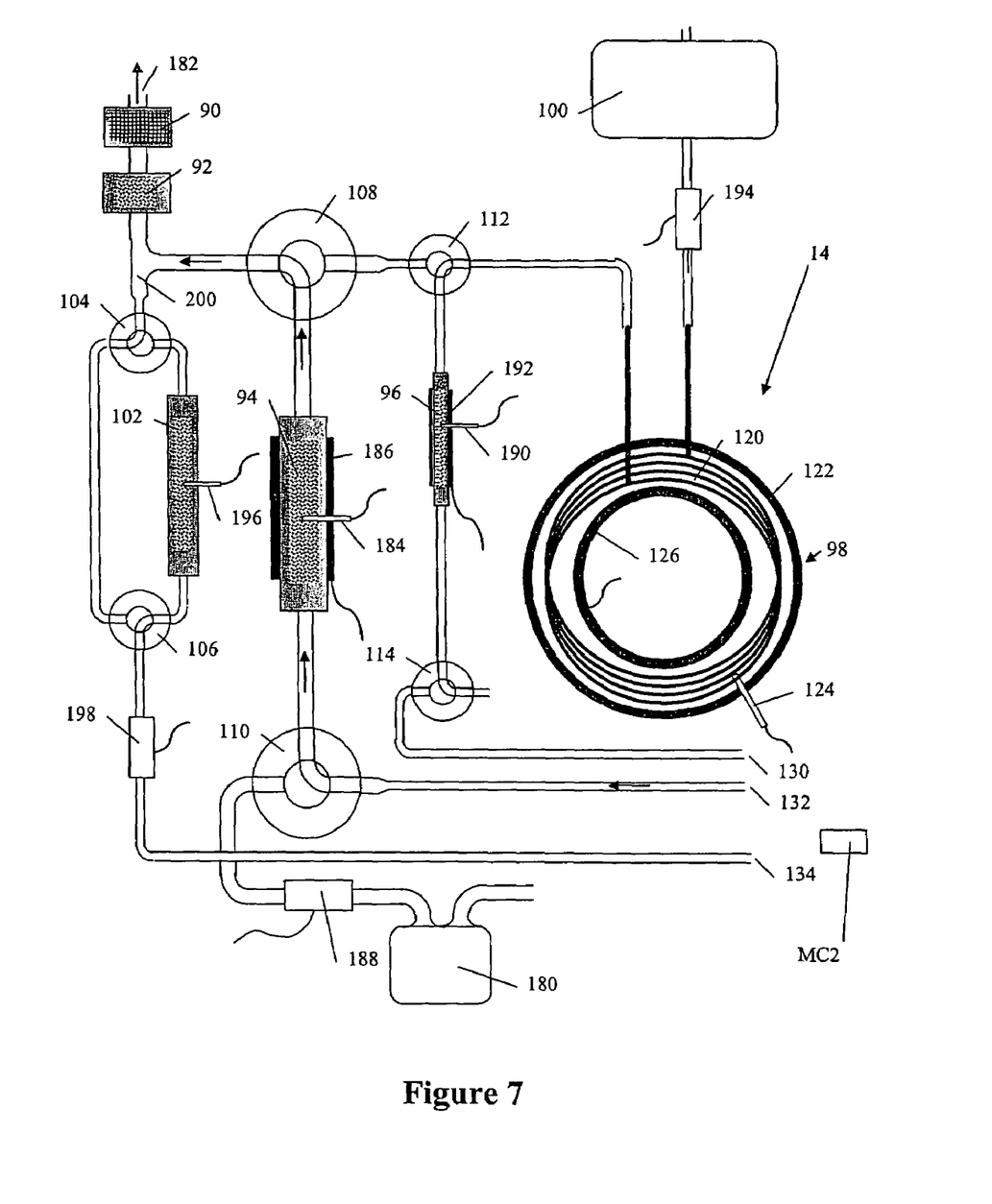
FIG. 7 is a schematic view of a valve configuration and flow pattern of the detection unit of FIG. 3 during a heating step.

The next step is the heating step, and the valve configuration and flow pattern is shown in FIG. 7. During the heating step, the enriching member 96 is isolated and quickly heated to approximately 200° C., and is maintained at this high temperature for a predetermined period of time. During this time, any adsorbed chemical will desorb into a gas phase. During the heating step, the temperature of the sampling member 94 is raised to approximately 200° C. while a small stream of clean air from clean air port 132 slowly passes through the sampling member to purge residual chemicals (if any) out from the sampling member, thus completely cleaning the sampling member for the next test cycle.

Figure 8:
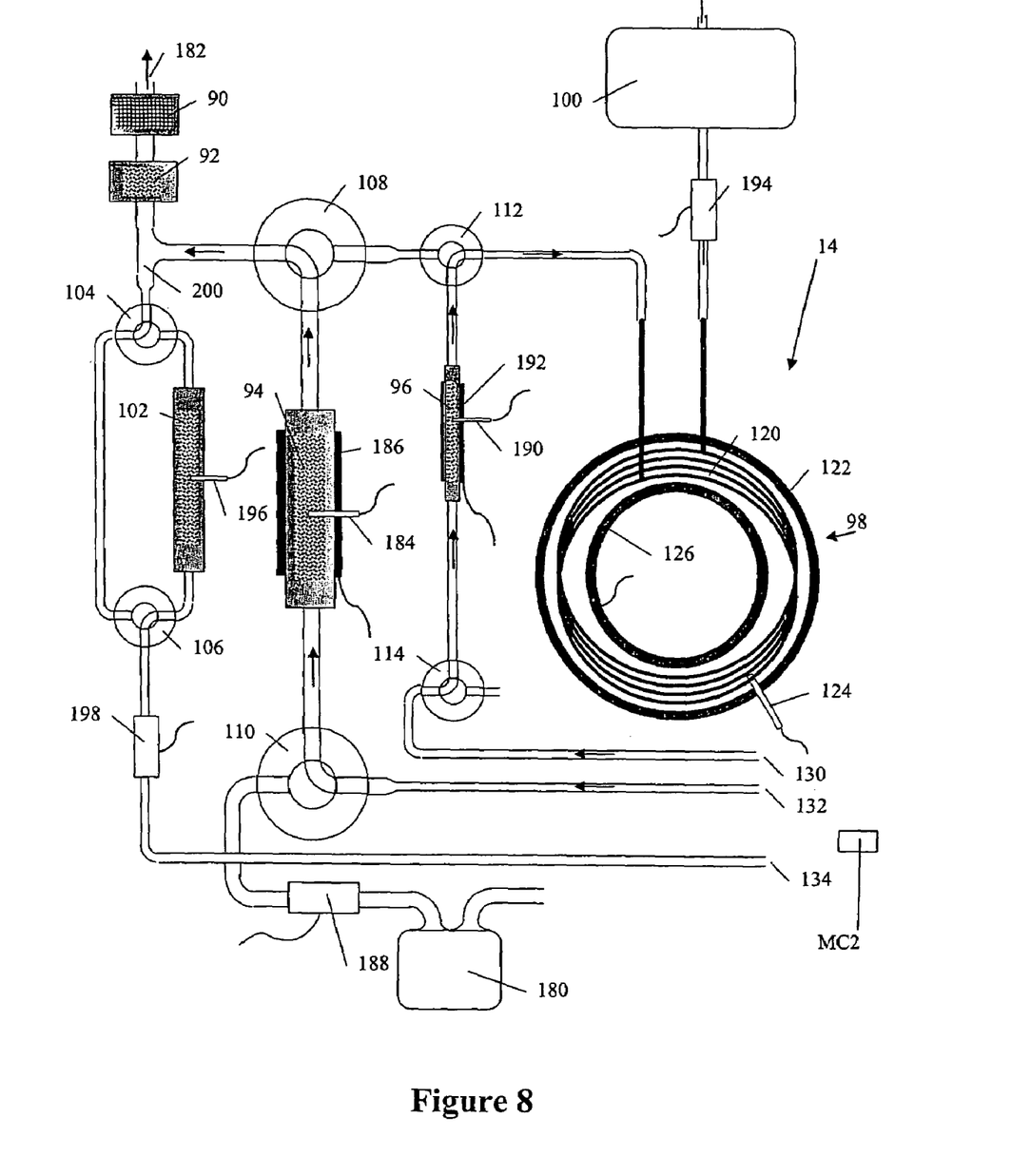
FIG. 8 is a schematic view of a valve configuration and flow pattern of the detection unit of FIG. 3 during a detecting step.

The final step is the detecting step, and the valve configuration and flow pattern for this step is shown in FIG. 8. During the detecting step, a constant stream of clean air from air port 130, typically regulated at 50 ml/min, passes through the enriching member 96 which is still kept at the relatively high temperature of approximately 200° C., bringing the desorbed chemicals from the enriching member into the GC column 120. The GC column is typically regulated at a constant temperature of approximately 100° C. The chemical concentration gradually evolves through the GC column 120. The existence of the hydrophilic test chemical in the air stream shows up in the detector 100 as a concentration peak, separated from the peaks of any other impurities. The micro-controller MC2 in the detection unit 14 will detect the concentration peak and integrate a mass based on a concentration value and a flow rate measured by a flow meter 194. The detected mass of the hydrophilic test chemical is then compared with the injected mass of the hydrophilic test chemical which has been integrated during the sampling step, and a leakage fraction of the filter F can be calculated. Thus, the detection assembly samples, enriches, separates, and detects the leaked test chemical.

Figure 9:
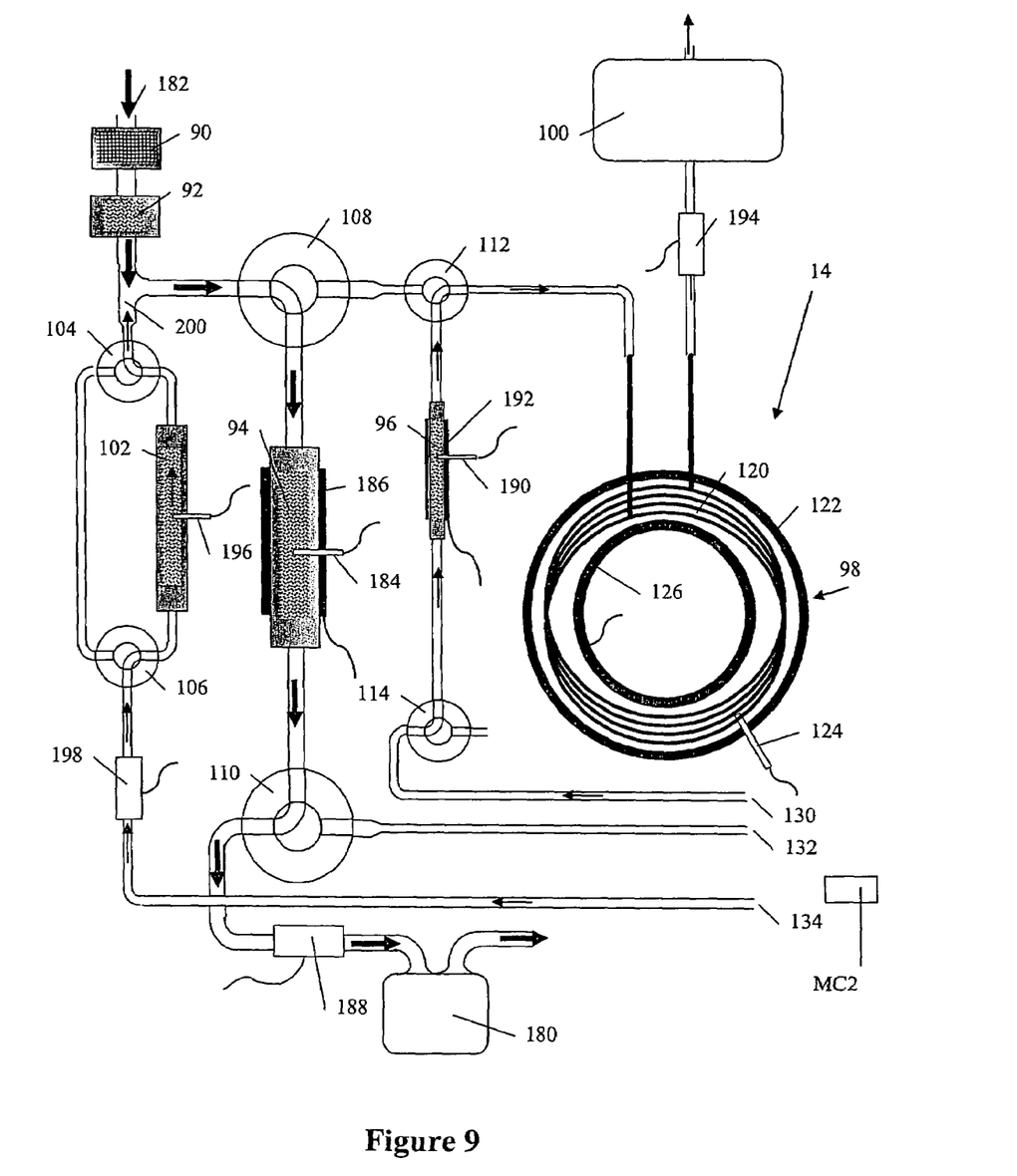
FIG. 9 is a schematic view of a valve configuration and flow pattern of the detection unit of FIG. 3 during a sampling step for a calibration cycle of the detection unit.
Figure 10:
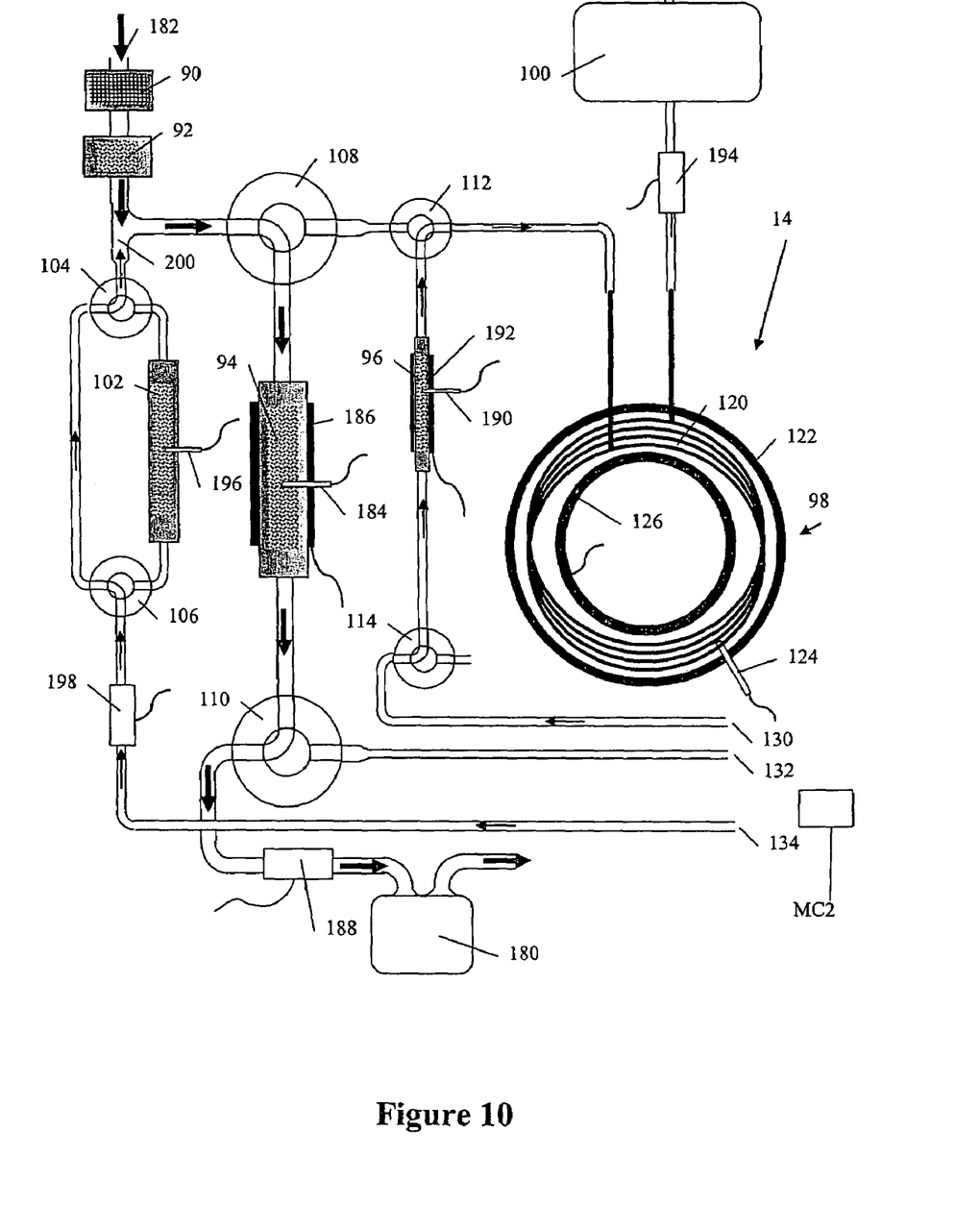
FIG. 10 is a schematic view of a valve configuration and flow pattern of the detection unit of FIG. 3 during a sampling step for a calibration cycle during a line purging.

With reference to FIG. 9, the filter integrity tester 10 can be calibrated for an accurate test operation. To do so, a complete filter integrity cycle described above is executed; however, no hydrophilic test chemical is injected during the injecting/sampling step. Instead, a known amount of the hydrophilic test chemical, typically in the range of a few micrograms, is injected from the calibration member 102 into the sampling member 94. The calibration member 102 is packed with carbonaceous adsorbent and is pre-saturated at a constant concentration of the hydrophilic test chemical (e.g. approximately 1 ppm) and, at a constant temperature (e.g. approximately 50° C.). Adsorption isotherms with a certain temperature effect are pre-measured and isotherm model parameters are stored in the micro-controller MC2 program. Thus, the equilibrium concentration of the hydrophilic test chemical can be calculated from the temperature measured by a temperature probe 196, such as a RTD, of the calibration member 102. A flow rate through the calibration member is measured by a flow meter 198. Thus, the micro-controller MC2 is able to integrate a mass injected from the calibration member 102 into the sampling member 94 over a sampling time. Once a target mass is reached, the three-way valves 104 and 106 are reversed so that the calibration member is bypassed and a stream of clean air purges a transfer line 200 in order to make sure that no residual hydrophilic test chemical remains in the transfer line (see FIG. 10).

After completing the sampling step, the remaining filter integrity cycle steps can be executed in exactly the same order as those of the typical test cycle. The final detected mass as measured through the integration of a hydrophilic test chemical peak coming out from the GC column 120 is then compared to the target calibration injected mass, and if the relative difference is within a range (e.g. plus or minus approximately 50%), the system can be justified as normal.

The exemplary embodiment of the present invention has been described with reference to a preferred embodiment. Obviously, modifications and alterations, will occur to others upon reading and understanding the preceding detailed description. It is intended that the invention not be limited to the embodiment described. Rather, the present invention should be construed as including all such modifications and alterations which come within the scope of the appended claims or the equivalents thereof.

What is claimed is:

1. A method of testing filter integrity comprising:
vaporizing a hydrophilic test chemical in air to form a vapor;
injecting the vapor into an inlet air stream of an adsorbent filter;
detecting the existence and concentration of the vapor in an outlet air stream from the filter, the detecting step including:
collecting a portion of the vapor from said outlet air stream from said filter;
generating a volume of clean air,
enriching a portion of said volume of clean air with said collected hydrophilic test chemical; and
determining the existence and extent of a leak in the filter.

2. The method of claim 1, wherein said vaporizing step includes the steps of:
passing a pressurized air stream through a port;
mixing said air stream with said hydrophilic test chemical to form a mixture; and
passing the mixture through a contact bed having an inert packing media, said inert packing media being wetted with said hydrophilic test chemical.

3. The method of claim 2, further including the steps of:
saturating the mixture with the hydrophilic test chemical; and
mixing the saturated mixture with air to form the vapor.

4. The method of claim 3, further including the steps of:
compensating for a heat loss in said contact bed by constantly passing the mixture through the contact bed; and
maintaining said hydrophilic test chemical at a relatively constant temperature.

5. The method of claim 1, wherein said detecting step further includes the steps of detecting an amount and a mass of said hydrophilic test chemical collected.

6. The method of claim 1, wherein said collecting step further includes the step of passing a portion of said outlet air stream in a first direction through a chemical sampling member having a hydrophobic adsorbent for collecting said hydrophilic test chemical.

7. The method of claim 6, wherein said enriching step further includes the steps of:
heating said chemical sampling member allowing said collected sampled hydrophilic test chemical to desorb into a gas phase while passing a stream of clean air through said chemical sampling member in a second direction countercurrent to said first direction; and
directing said stream of air through a chemical enriching member having a hydrophobic adsorbent for collecting said hydrophilic test chemical from an outlet of said chemical sampling member.

8. The method of claim 7, wherein said detecting step further includes the step of:
heating said chemical enriching member while passing a stream of clean air through said chemical enriching member;
directing an outlet air stream from said chemical enriching member into a gas chromatography column; and,
detecting an outlet air stream from said gas chromatography column for chemicals including said hydrophilic test chemical.

9. The method of claim 8, wherein said detecting step further includes the step measuring a concentration of said hydrophilic test chemical, measuring a flow rate of said outlet air stream from said gas chromatography column and integrating a mass of said hydrophilic test chemical.

10. The method of claim 9, wherein the collecting step further includes integrating a mass of said injected hydrophilic test chemical, and the determining step includes comparing the detected mass of said hydrophilic test chemical with said integrated mass of said hydrophilic test chemical.

11. The method of claim 6, wherein the collecting step further includes removing particulates and low-volatility chemicals from said portion of said outlet air stream prior to passing said air stream through said chemical sampling member.

* * * * *